Patented Jan. 8, 1946

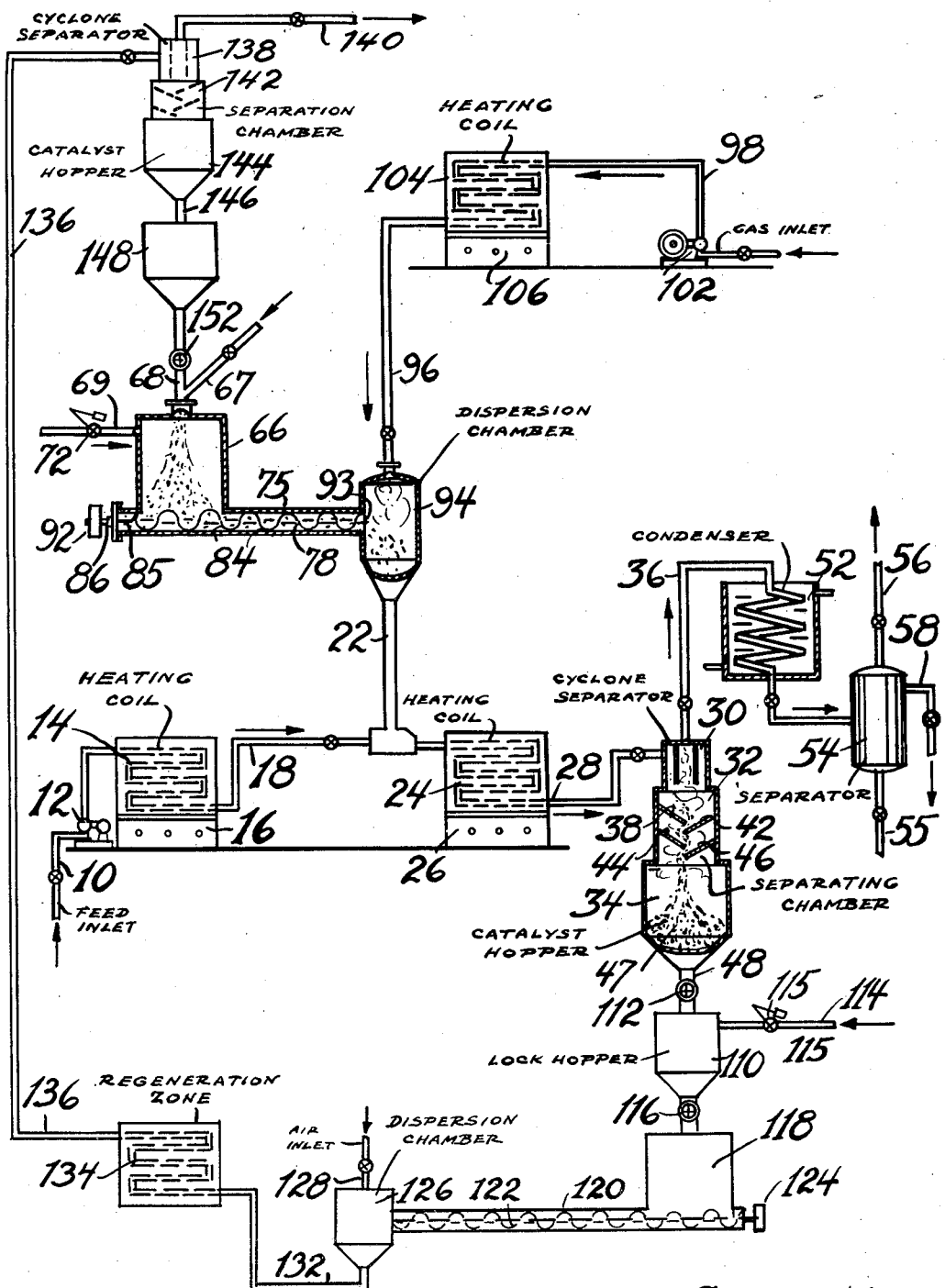

2,392,764

UNITED STATES PATENT OFFICE 2,392,764

HANDLING PULVERULENT MATERIALS

Edward D. Reeves, Cranford, N. J., assignor to Standard Oil Development Company, a corporation of Delaware Application September 14, 1940, Serial No. 356,847

17 Claims. (Cl. 196—52)

This invention relates to handling finely divided, powdered or comminuted solid materials.

My invention includes a method of controlling the rate of delivery of powdered material to a reaction zone, storage zone or the like, and more particularly relates to a method of controlling the rate of delivery of a powdered catalyst to a conversion zone whereby the ratio of the reactant to the powdered catalyst is maintained substantially constant.

In the catalytic conversion of hydrocarbons, it is often advantageous to employ a powdered catalyst which is fed continuously into the converter and which is also continuously withdrawn and may be fed continuously to a catalytic regeneration system whereby it is regenerated for further use. Such systems have many advantages from the standpoint of process control, product distribution, etc. over non-catalytic methods of operation or over catalytic methods of operation employing stationary catalysts.

A major difficulty in the operation of continuous powdered catalyst systems, however, lies in the continuous introduction, withdrawal and transfer of the powdered catalyst at a uniform rate. This difficulty arises from the fact that it is extremely troublesome to pump and meter the powdered catalyst, particularly in operations employing high temperatures and/or pressures where the catalyst must be handled in a closed system and not exposed to the atmosphere.

Conventional apparatus such as star feeders, Fuller Kinyon pumps, etc. have many disadvantages due to lack of uniformity of catalyst feed and have not been satisfactory. Such systems are also quite erratic in operation and it is difficult to adequately meter the catalyst flow through transfer equipment of this type.

According to my invention, however, all of the above disadvantages may be overcome, and a steady controllable flow of powdered catalyst can be maintained to the reaction vessel. This is accomplished by the use of an agitating orifice which may be in the form of a cylindrical barrel containing a non-compression type screw to regulate flow of catalyst from the feed hopper to the reactor. Control of catalyst flow through the agitating orifice is obtained by imposing a definite pressure drop across the orifice by means of pressure regulating devices which supply inert gases to the feed hopper and the orifice discharge. Increase or decrease in catalyst flow is then controlled by variations in the pressures on the hopper and orifice discharge, the greater the pressure differential, the greater the flow of catalyst to the reactor. Since the purpose of the non-compression screw in the orifice is merely to agitate the catalyst and maintain it in a fluid state, it is only necessary to rotate the screw at sufficient speed to secure adequate agitation, and, within this range, the flow of catalyst is not affected by the screw speed as will be pointed out later.

My invention also provides a simplified method for the control of the pressure differential and, in consequence, the rate of powder flow through the agitating orifice. This is accomplished by utilizing a secondary system consisting of a vessel of restricted cross-sectional area for automatic regulation of the downstream pressure at the agitating orifice so that it is only necessary to maintain the pressure in the feed hopper at a predetermined pressure in order to secure any desired constant rate of catalyst flow. Furthermore, in many cases the reaction vessel itself may be employed as the secondary control.

It is known that if a gas is forced through a vessel of restricted cross sectional area at a constant velocity, there will be a pressure drop from the inlet to the outlet of the vessel depending on the density. Any change in the gas density will change the pressure drop and this pressure drop may be used as a rough measure of the gas density. Powdered material suspended in a gas changes the effective density of the gas and the pressure drop obtained by passing such a suspension through a vessel may be used as a comparative measure of the concentration of the powdered material in the gas and also to maintain the flow of material substantially constant. The pressure drop across the screw conveyor is used for handling powdered material according to my invention as will be hereinafter pointed out in greater detail. The amount of powdered material delivered may be controlled by varying the pressure drop through the apparatus or parts thereof.

Various types of screw conveyors may be used and preferably a non-compression type of screw is used. An auxiliary vessel comprising an elongated vessel or member of restricted cross sectional area is preferably used with the screw mechanism and, when used, serves as meter of the flow of powdered material and also modifies the action of the orifice itself. The pressure drop across the screw conveyor and vessel is used to maintain the flow of powdered material substantially constant.

In one form of the invention, vaporized hydrocarbon oil is mixed with the powdered material and then passed through a conversion zone such as a coil, for example. If desired, steam or other gas at a constant velocity may be introduced into a chamber for dispersing the powdered material before mixing the powdered material with the oil to be converted. There is a pressure drop across the conversion zone which varies if the ratio of oil vapors to catalyst is varied and this change in pressure drop is used to feed more or less powdered material from the screw mechanism to the dispersion chamber when the catalyst or powdered material in the hopper is under a uniform superatmospheric pressure. In this way the feed of the powdered material is maintained substantially constant.

After the conversion is effected to the desired extent, it is necessary to regenerate the catalyst particles which have become inactive due to carbonaceous deposits thereon. My invention further contemplates conveying the inactive particles, regenerating them and returning them to the main hopper for reuse in the conversion process. After having passed through the conversion zone, the catalyst particles may be conveyed according to my invention to a regeneration zone, to storage or they may be recirculated to the conversion zone either before or after regeneration.

My invention may also be used generally in any apparatus in which it is desired to maintain and measure a constant rate of flow of powdered material.

In the drawing, the figure represents a diagrammatic showing of one form of apparatus adapted for carrying out my invention.

Referring now to the drawing, the reference character 10 designates a line through which the hydrocarbon oil to be treated or other reactant is passed. A pump 12 is provided for forcing the hydrocarbon feed through a heating coil 14 arranged in a heater 16. The oil to be treated is a relatively heavy hydrocarbon oil, such as gas oil. However, other feed stocks may be used which are to be treated with catalytic material. If gas oil is passed through the heating coil 14, it is substantially completely vaporized and the vapors are passed through line 18 which communicates with line 22. Any unvaporized oil may be separated in any suitable manner.

The oil vapors are mixed with powdered material or catalyst material passing through line 22, and the mixture is passed through heating coil 24 in a heater 26. The heater 26 and coil 24 provide a conversion zone for maintaining the oil vapors at a conversion temperature for the desired length of time to effect the desired extent of conversion. If necessary, heat may be supplied to maintain the oil vapors at the proper temperature.

If desired, steam or other gas or gases, such as nitrogen, ethane, hydrogen, waste combustion gases and so forth, which may or may not be inert, may be used for dispersing the powdered or catalytic material before it is mixed with the oil vapors. In some instances, the oil vapors themselves may be used as the dispersing medium. A more detailed description of the method of introducing the powdered material or catalyst will be hereinafter given.

The oil vapors are maintained at a temperature of about 850° F. to 1100° F. in the presence of the powdered material or catalyst. Moderate pressures up to about 150 lbs. per sq. in. are usually used in the conversion zone 26 but higher pressures may be used, if desired. The rate of feeding the oil vapors through the conversion zone 26 is about 0.1 to 2 pounds of liquid oil per pound of catalyst per hour.

After passing through the coil 24 in conversion zone 26, the products of conversion together with the powdered catalytic material are passed through line 28 into a cyclone separator 30 for separating catalyst particles from vapors. The catalyst particles drop into a separating chamber 32 which forms the upper part of a used catalyst hopper 34. The separated vapors pass overhead through line 36. During the conversion, the powdered material becomes coated with carbonaceous material and the activity of the powdered catalytic material is reduced. The catalytic material having lowered activity may be recirculated but it is preferably removed from the products of conversion and regenerated before reusing it. From the above it will be seen that the catalyst particles are removed from the hydrocarbon vapors in a relatively dry state and substantially no condensation of hydrocarbons is effected.

The separating chamber 32 is provided with inclined baffle plates 38, 42, 44 and 46 so that as the fouled catalytic material is introduced into the separating chamber 32, the solid catalytic material falls downwardly on the first inclined baffle 38, then passes down to the second inclined baffle 42, then down to the third baffle 44, and finally down to the inclined baffle 46 from which it falls into the lower portion 47 of container or used catalyst hopper 34. More or fewer baffles may be used if desired. If desired, steam may be introduced into the lower portion of separating chamber 32 or hopper 34 to assist in vaporizing and removing hydrocarbons from the solid or catalyst particles. The hydrocarbon vapors separated from the solid materials are passed overhead through line 36 to a condenser as will be presently described.

The used catalytic material is withdrawn from the lower portion of hopper 34 through valved line 48 and may be regenerated in any desired manner for reuse in the process. For example, the carbonaceous material may be burned from the solid or catalytic particles, care being taken during the combustion to avoid overheating of the catalytic particles. One form of regeneration will be hereinafter described in greater detail.

The vapors passing overhead through line 36 are passed through a suitable condenser 52 to condense normally liquid hydrocarbons, and the cooled and condensed products are introduced into a separator 54. If steam is used in the process, the condensed water is withdrawn from separator 54 through line 55. Uncondensed gases pass overhead from the separator 54 through line 56. Condensed normally liquid hydrocarbons are withdrawn through line 58 from the separator and may be treated in any desired manner to separate the desired constituents therefrom. For example, the liquid hydrocarbons may be heated and vaporized and then fractionated to separate a gasoline fraction from condensate oil. The condensate oil may be recycled to the inlet 10 and catalytically converted, or it may be treated in any desirable manner.

The method of introducing catalytic material to the oil vapors and of maintaining the ratio of oil to catalyst substantially constant will now be described. It is to be understood, however, that my invention may also be used to vary or regulate the pressure drop across the apparatus or parts thereof to vary the amount of powdered material delivered. The enclosed hopper 66 is provided, into which the fresh powdered material or catalytic material is introduced in any suitable manner through valved inlet 67. Regenerated catalyst is introduced through line 68. The powdered material is maintained under a substantially uniform superatmospheric pressure, the fluid pressure being supplied through line 69. A pressure regulator 72 is provided in line 69 to maintain the pressure in the hopper or container 66 substantially uniform.

The bottom portion of the hopper or container 66 is provided with an extension or trough 75 in which is mounted a screw conveyor or mechanism 78 preferably of the non-compression type. There may be a slight clearance between the threads of the screw mechanism and the trough 75 as at 84 but it is not essential. The screw mechanism is preferably provided with a shaft 85 which extends through a suitable bushing 86 in order to prevent loss of catalyst material or pressure from the hopper or container 66. A pulley or the like 92 is provided for rotating the screw mechanism 78. The delivery or discharge end 93 of the screw mechanism 78 may be supported in any desirable manner.

The powdered material or catalyst material is fed from the container or hopper 66 at a substantially uniform rate when the pressure in the container or hopper 66 is maintained substantially constant. In the preferred form of the invention, the powdered material or catalyst is introduced into a dispersion chamber 94 where the catalyst or powdered material is dispersed by means of steam or other gas introduced through line 96. As shown in the drawing, the steam or other gas is introduced into the top of chamber 94 but other points of introduction may be used. For example, the steam or other gas may be introduced through an opening in the side of the chamber opposite the delivery end 93 of the screw mechanism 78.

The flow of catalyst or powdered material through conduit or trough 75 is controllable by variation of the pressure drop between hopper 66 and dispersion chamber 94. The pressure drop may be controlled by maintaining a substantially constant pressure on the catalyst hopper 66 while varying the pressure in the chamber 94 by introducing gases through line 96, by maintaining a substantially constant pressure in the dispersion chamber 94 and varying the pressure on the hopper 66 or by a combination of these procedures. The flow of powdered material from the hopper 66 may be maintained substantially constant or the flow may be varied as desired.

The steam or other gas is preferably heated to a relatively high temperature and for this heating the steam or other gas is preferably passed through line 98 by pump 102 and is passed through a heating coil 104 in heater 106. The steam or other gas is preferably heated to about the temperature of the oil vapors being passed through line 18 after being vaporized in heating coil 14. The pressure of the steam in line 96 and oil vapors in line 18 is about the same and is about equal to the pressure existing at the discharge end 93 of the screw mechanism 78. Instead of using steam as a dispersing medium, the oil vapors themselves may be used, and when this form of the invention is used, the heated oil vapors are preferably introduced into the dispersion chamber 94. Pressure gauges may be used in lines 18 and 96.

The powdered material should be at a temperature about that of the oil vapors with which it is mixed. The particle size of the powdered material for catalytic cracking operations or the like should be such that most of the material will pass through a screen of 100 to 300 mesh. Any suitable powdered catalyst may be used, such as, for example, clays, activated clays, synthetic gels containing silica and alumina, or the like.

The method of supplying the powdered or catalytic material to the oil vapors or other vapors or gases forms an important feature of my invention and one form of the invention will now be described. When a substantially uniform pressure is maintained on the container or hopper 66 and on the catalytic or powdered material therein, there will be a certain pressure drop across the screw mechanism 78, and the amount of powdered material introduced into the dispersion chamber 94 is proportional to the pressure drop existing across the screw mechanism. With the screw mechanism 78 rotating and with a substantially uniform pressure in the container 66, the screw mechanism in effect acts as an agitating orifice.

The powdered material or catalyst particles introduced into chamber 94 are first mixed with steam or other heated gas introduced through line 96, and this mixture is passed through line 22. Oil vapors heated to about 800° to 1100° F. and passing through line 18 are introduced into line 22 and mixed with the powdered catalyst and this mixture is passed through coil 24 much the same as a stream of fluid. The oil vapors are introduced at a substantially constant rate when my invention is used for catalytic cracking of hydrocarbons. The gas such as steam is passed through lines 96 and 22 at a substantially constant rate.

It is known that if a fluid or gaseous material is forced through a vessel of restricted cross sectional area, such as a pipe or coil, at a constant velocity, there will be a pressure drop from the inlet to the outlet of the vessel, depending on the gas velocity, density, and so forth, in accordance with well-known engineering principles. It is further known that the pressure drop of the gaseous material through the vessel of restricted cross sectional area is proportional to the density of the gas or gaseous material, and any change in the gas density will materially affect the pressure drop through the vessel.

For a constant velocity, the pressure drop observed will serve as a rough measure of the density of the gas. This relationship holds true for fluids generally and for gases containing powdered material where the powdered material is suspended or carried along by the gas as a fluid stream. For example, if gases passing through a coil or other vessel of restricted cross sectional area at a flow rate of about one cubic foot per minute show a pressure drop of about five pounds from the inlet to the outlet of the coil or vessel, this pressure drop will be changed if a certain amount of powdered material or catalyst is mixed with the gas stream.

If the powdered catalyst or material is mixed with the gas stream to such an extent that the effective density of the gas stream is doubled, the pressure drop through the coil or vessel will be increased in proportion. Addition of higher concentrations of powdered material or catalyst to the gas stream will likewise result in a proportionate increase in pressure drop through the coil or vessel. From the above, it is evident that the pressure drop through the coil or vessel may be used as a measure of the catalyst concentration in the gas stream.

As above pointed out, the screw mechanism acts as an agitating orifice and a certain pressure drop exists across the screw mechanism. I have found that it is possible, according to my invention, to feed powdered catalyst accurately and at a substantially constant measured rate from a feed hopper by the combination of an agitating orifice and a vessel of restricted cross sectional area, such as a coil, pipe or the like through which gas is being passed at a constant rate. A certain pressure drop will be found from the feed hopper 66 to the exit of the coil 24 and by a suitable regulation of this pressure drop any desired catalyst flow can be obtained within the limits of the equipment. In catalytic conversion operations the conversion coil comprises the vessel of restricted cross sectional area.

For example, if the total pressure drop across the feed hopper 66 and conversion coil 24 amounts to about 30 pounds per square inch, and under normal operating conditions the catalyst flow amounts to about 10 kg. per hour, it is preferable to employ equipment of such a size that the pressure drop across the screw mechanism 78 or the agitating orifice will be about one to two pounds, while the pressure drop through the coil 24 will be about 28 to 29 pounds. The rate of feeding of the catalyst material from the feed hopper 66 is substantially independent of the rotation of the screw mechanism 78, but is proportional to the pressure existing in the feed hopper 66.

Under normal conditions and maintaining the pressure substantially constant in the hopper 66, the catalyst material will be fed substantially constantly into the dispersion chamber 94 and the correct amount of catalyst will be mixed with the oil vapors for passage through the conversion coil 24.

The steam and catalyst particles after dispersion in the chamber 94 are passed through line 22 as a stream of gaseous material, and as above pointed out, the density of the stream will affect the pressure drop through the conversion coil 24. This pressure drop is also used to regulate the amount of catalyst being delivered from the catalyst hopper 66 by the screw mechanism 78 as follows. With the steam at constant velocity and feeding the oil vapors at a constant rate, and also with the pressure substantially uniform in the catalyst hopper 66, there will be a certain pressure drop across the screw mechanism 78 and across the conversion coil 24.

If for any reason the catalyst flow through the agitating orifice or past the screw mechanism 78 is diminished, the amount of catalyst being injected into the gas stream will be diminished and the density of the gas stream will be decreased. This will immediately decrease the pressure drop across the coil 24 and impose a larger pressure drop across the screw mechanism 78 or the agitating orifice itself, and this larger pressure drop will automatically increase the flow of catalyst through the orifice and bring it back to its normal rate.

If the catalyst flow through the orifice is increased for any reason, the amount of catalyst being injected into the gas stream will be increased and the density of the gas stream will be increased. This will immediately cause an increase in pressure drop across the coil 24, and this will result in reducing the pressure drop across the orifice or screw mechanism 78, and in this way the flow of catalyst will be reduced and returned to normal.

The amount of catalyst delivered may be varied by changing the pressure on hopper 66. The concentration of the powdered material in the gaseous medium may be controlled by regulating the pressure drop through the reaction coil, screw mechanism or other associated parts of the apparatus. For example, by increasing the pressure on hopper 66, more powdered material will be introduced into dispersion chamber 94.

In some instances in which apparatus is used where an insufficient pressure drop is obtained through the coil 24 a restricted orifice or Venturi nozzle may be introduced into line 22 in order to create the desired pressure drop.

When my invention is used for the catalytic cracking or conversion of hydrocarbons the catalytic particles become coated with carbonaceous material and it is necessary to regenerate the catalyst particles so that they may be reused in the process. Or the inactive and fouled catalyst may be sent to storage by using the principles of my invention. Preferably the regeneration is carried out under superatmospheric pressure and the carbonaceous material is burned off of the catalyst particles in a regeneration zone under pressure.

The fouled catalyst particles collecting in the bottom of the used catalyst hopper 47 are withdrawn from the bottom of the hopper 47 through line 48 and introduced into a lock hopper 110 which is separated from the used catalyst hopper 47 by a rotatable feeding device 112 whereby the used catalyst hopper 47 and the lock hopper 110 may be maintained under different pressures. The lock hopper 110 is maintained under superatmospheric pressure by fluid under pressure introduced through line 114 provided with a pressure control valve 115 so that the pressure in the lock hopper 110 is maintained substantially constant.

The fouled catalyst particles collecting in the lock hopper 110 are withdrawn from the bottom thereof through a star feeder 116 or the like and are introduced into another hopper 118 provided with a trough 120 and a non-compression screw feed mechanism 122. A pulley or the like 124 is provided for rotating the screw mechanism. The fouled catalyst is introduced into a dispersion chamber 126 where it is mixed with air or other oxidizing agent introduced into the dispersion chamber 126 by means of line 128. The catalyst particles in suspension are withdrawn from the bottom of the dispersion chamber 126 and are passed through line 132 to a regeneration zone 134, which is shown as a coil but other forms may be used. The air or other oxidizing agent acts to burn off the carbonaceous deposit from the catalyst particles during passage through the regeneration zone 134. It is not necessary to add external heat but it is advisable to control the temperature of the catalyst particles undergoing regeneration so that the temperature is not unduly raised. Too high temperatures render the catalyst particles inactive or reduce the activity of the catalyst.

After leaving the regeneration zone 134 the catalyst particles and products of combustion are passed through line 136 to a cyclone separator 138 wherein regenerated catalyst particles are separated from products of combustion and other gases. The separated gases are passed overhead through line 140. The catalyst particles which are separated from the gases are dropped into the separating chamber 142 and then into the catalyst hopper 144. The regenerated catalyst particles collecting at the bottom of the hopper 144 are passed through line 146 to another hopper 148. The catalyst particles are withdrawn from the bottom of the second hopper 148 and are fed through a star feeder or the like 152 and introduced into line 68 by means of which they are introduced into the main catalyst hopper 66 above described.

In passing the fouled catalyst through the regenerating system the catalyst particles are placed under pressure which is maintained substantially uniform in the hopper 118 and the pressure drops over the screw mechanism and through the regeneration zone 134 are used to convey the catalyst particles back to the beginning of the operation and they are introduced into the main hopper 66.

By varying the pressure on hopper 118, the amount of catalyst particles passing through the regeneration zone may be controlled as desired. The velocity of the air passing through line 128 may be varied. Other means such as a Venturi nozzle may be used to obtain the desired pressure drop through the system. The screw mechanism 122 acts as an agitating orifice. The principles above discussed in connection with feeding the catalyst particles through the heating coil 24 in admixture with hydrocarbon vapors also apply to the steps of regenerating the catalyst particles and returning them to the hopper 66.

In a specific example, activated clay particles in hopper 66 are maintained under a pressure of about 30 lbs. per sq. in. Steam under a pressure of about 30 lbs. per sq. in. and at a temperature of about 900° F. is passed through line 96 and introduced into chamber 94. The volume of the steam or other gas is maintained substantially constant at about 50 cu. ft. of powder. Gas oil vapors at a temperature of about 900° F. and under pressure of about 30 lbs. per sq. in. are passed through line 18. Under the above conditions about 0.3 volume of liquid oil per volume of catalyst per hour are admixed.

This mixture is passed through conversion zone 24 in about 0.5 minute and the mixture during its passage through zone 24 is at about 900° F. The products of conversion at a temperature of about 900° F. and under a pressure of about 0 lb. per sq. in. or about atmospheric pressure are introduced into separating chamber 32. The pressure drop across screw mechanism 78 is about ½ lb. per sq. in. and the pressure drop from hopper 66 to separating chamber 32 is about 30 lbs. per sq. in. The screw mechanism 78 is rotated at about 40 R. P. M.

The separated catalyst particles which accumulate in the used catalyst hopper 47 have had their catalytic activity reduced by the deposition of carbonaceous material on the catalyst particles. It is desirable to remove the carbonaceous deposit as for example, by burning, in order to reactivate the catalyst particles. The fouled catalyst particles are introduced into the pressure or lock hopper 110 wherein they are subjected to a pressure of about 50 lbs. per sq. in. They are then passed through the hopper 118 wherein they are maintained under substantially the same pressure of 50 lbs. per sq. in. The catalyst particles are moved along through the trough 120 by means of the conveyor screw mechanism 122 and are mixed with air in the dispersion chamber 126. The pressure drop across the screw mechanism 122 is about 1 lb./sq. in. The catalyst particles in an air suspension are then passed through the regeneration zone 134 at a temperature of about 950° F. and are passed through the regeneration zone in about 30 seconds.

After passing through the regeneration zone 134 which is shown as a coil, the catalyst particles in suspension are at a lower pressure of about 30 lbs. per sq. in. The pressure on the catalyst suspension has fallen from about 49 to about 30 lbs. per sq. in. during passage through the regeneration zone 134. The catalyst particles in regenerated form are then separated from the gases and are introduced into the main hopper 66 under a pressure of about 30 lbs. per sq. in.

While the specific example above given relates to catalytic cracking it is to be understood that my invention may be used for other purposes and is not restricted to the specific equipment illustrated. My invention may be used in other cases where it is desired to maintain a substantially constant rate of flow of powdered material dispersed in a fluid medium.

The following data show how the catalyst flow varies with the pressure. These data were obtained as a result of work carried out in a system consisting of a catalyst feed hopper, an agitating orifice, a reaction coil, catalyst separator, and catalyst receiver together with auxiliary pressure and flow control equipment as shown in the figure. Powdered catalyst of about 300 mesh was placed in hopper 66 and measured amounts of dispersion gases and reactant gases were fed into the system through lines 96 and 18 by means of flow meters not shown. Under the flow conditions employed, the pressure drop across reactor 24 was 7 lbs./sq. in., or since the outlet from the reactor was maintained at atmospheric pressure, the pressure at 94 was 7 lbs./sq. in. gauge. The agitator in the orifice comprising screw mechanism 78 was then rotated at 10–40 R. P. M. by means of drive 92 and a pressure of 7 lbs./sq. in. imposed at 66 by means of pressure controller 72. Under these conditions, no catalyst flow was obtained through the orifice because no differential existed across the orifice in spite of the fact that the screw was being rotated. Increased pressures were then imposed at 66 and the following rates of flow obtained at the pressures indicated:

| Pressure at 66 lbs./sq. in. gauge | Catalyst flow through reactor, kg./hr. |
| --- | --- |
| 7 | 0 |
| 18.5 | 5 |
| 30 | 10 |
| 41.5 | 15 |

During the course of the work, the screw was rotated at speeds ranging from 10–40 R. P. M. and also in reverse. No effect on catalyst flow of speed or direction of rotation was observed within this range. Operation without any rotation of the screw, however, resulted in very erratic catalyst flows; for example, these varied from 0–10 kg./hr. with 30 lbs. at 66 in consecutive experiments and represented entirely unsatisfactory operation.

From the above work it will be seen that it is necessary to overcome the pressure drop through the particular system used. Where small equipment is used the pressure drop will be greater than when larger equipment is used. In the apparatus used in the above work it was necessary to have a pressure greater than 7 lbs./sq. in.

on the hopper 66 in order to get any flow of catalyst particles. The amount of pressure necessary to overcome the pressure drop will vary with different equipment and may be easily determined by trial runs. The figure of 7 lbs./sq. in. above given will vary with different equipment. These data are included to show that rotation of the screw 78 is not effective to deliver catalyst to the system unless a sufficiently high pressure is maintained on the hopper 66 to overcome pressure drop through the system.

My invention comprises a screw conveyor mechanism which acts as an agitating orifice and which is preferably supplemented by an auxiliary equipment or vessel of restricted cross sectional area such as a pipe or coil. The feed hopper for a given desired feed of powdered material is maintained under a suitable substantially constant superatmospheric pressure. By changing the pressure on the catalyst in the catalyst hopper, the amount of catalyst particles or other particles leaving the hopper may be regulated and any desired rate may be selected. Gas under a substantially constant velocity is passed through the vessel having a restricted cross sectional area and the powdered material from the catalyst is dispersed in the gas stream. The amount of powdered material in the fluid stream is metered by noting its effect on the pressure drop through the vessel of restricted cross sectional area.

Modifications and changes within the scope of the invention may be made without departing from the spirit of my invention.

I claim:

1. In a method of catalytically cracking hydrocarbon oil wherein powdered catalyst is mixed with hydrocarbon oil and the mixture is passed through a conversion coil, the step of maintaining substantially uniform delivery of said catalyst to the hydrocarbon oil and said conversion coil which comprises maintaining a body of said powdered catalyst under substantially uniform superatmospheric pressure in a confined space, delivering catalyst from said confined space through an agitating orifice, mixing the catalyst with oil vapors introduced at a substantially constant rate and controlling the rate of delivery of the catalyst to the hydrocarbon oil by utilizing the pressure drop across said agitating orifice and said conversion coil so that if less catalyst is delivered and the effective density of the oil and catalyst stream is diminished, the pressure drop across said agitating orifice will increase and more catalyst will be delivered to the hydrocarbon oil passing to said conversion coil and if more catalyst than desired is delivered and the effective density of the oil and catalyst stream is increased the pressure drop across said agitating orifice will decrease and less catalyst will be delivered to the hydrocarbon oil passing to said conversion zone.

2. A method according to claim 1 wherein a gas at a substantially constant velocity is used to disperse the powdered catalyst delivered from said confined space to a dispersion chamber before the powdered catalyst is admixed with the hydrocarbon oil, the pressure drop of the stream of catalyst, gas and oil being utilized for controlling the rate of delivery of the catalyst to the oil.

3. A method for handling dry finely divided solid materials in a conduit system of restricted cross-sectional area, which comprises flowing such dry material through the system under a substantially constant superatmospheric pressure of a gaseous medium, passing such material through a fixed orifice during its introduction into the system, and controlling the rate of flow of said material through the system by regulating the pressure drop across said fixed orifice.

4. In a system for handling dry finely divided solid material a reservoir for said material, having an outlet, a conduit of restricted cross-sectional area communicating with said reservoir at the outlet, means for imposing substantially uniform superatmospheric fluid pressure on the reservoir, orifice means in said conduit, and means for regulating pressure drop across said orifice means.

5. In a system for the treatment of fluid materials in the presence of a finely divided catalyst wherein said system is provided with orifice means, the steps which comprise continuously feeding said catalyst into the system under substantially constant superatmospheric fluid pressure imposed thereon and controlling the pressure drop across said orifice means in said system for regulating the amount of catalyst supplied to said system.

6. Apparatus for the treatment of fluid materials in the presence of a finely divided catalyst, comprising a reactor having an inlet and an outlet, means for supplying a reactive gaseous fluid material at a substantially constant rate of flow to said reactor, means for supplying a finely divided solid catalyst to said reactor, said means being provided with an orifice, means for separating spent catalyst at the outlet of said reactor, and means for regulating pressure drop through the reactor and the orifice in said catalyst supply means for regulating the amount of catalyst supplied to said reactor.

7. In a method of catalytically cracking hydrocarbon oil wherein powdered catalyst is mixed with hydrocarbon oil and the mixture is passed through a conversion coil, the step of maintaining a substantially uniform delivery of catalyst to the hydrocarbon oil passing to said conversion coil which comprises maintaining a body of said powdered catalyst under substantially uniform superatmospheric pressure in a confined space, delivering said catalyst from said confined space through an agitating orifice and mixing the catalyst with oil vapors passing to said conversion coil at a substantially constant rate of flow, the pressure drop across said orifice and said conversion coil being used to maintain the delivery of catalyst from said confined space substantially constant.

8. In a method of catalytically cracking hydrocarbon oil, the steps of controlling the amount of catalyst mixed with the hydrocarbon oil which comprise, maintaining powdered catalyst in a closed container under substantially constant superatmospheric pressure, withdrawing powdered catalyst from said container by a non-compression screw conveyor, mixing the delivered catalyst with hydrocarbon oil introduced at a substantially constant rate of flow and passing the mixture through a conversion coil, the pressure drop from said container to the outlet of said coil being used to maintain the flow of powdered catalyst substantially constant.

9. A method of delivering controlled amounts of powdered catalyst material to hydrocarbon fluids to be converted which comprises maintaining powdered catalyst material in a closed container under substantially constant superatmospheric pressure, delivering powdered catalyst material from said container through an agitating orifice and mixing it with a gaseous stream introduced at a substantially constant rate of flow, mixing the gas and catalyst material with a hydrocarbon fluid introduced at a substantially constant rate of flow and passing the resulting mixture through a conversion coil and controlling the rate of delivery of the catalyst material to the hydrocarbon fluid by utilizing the pressure drop across said agitating orifice and said conversion coil.

10. A method of delivering controlled amounts of powdered catalyst material to hydrocarbon fluids to be converted which comprises maintaining powdered catalyst material in a closed container under substantially constant superatmospheric pressure, delivering powdered catalyst material from said container through an agitating orifice and mixing it with a gaseous stream introduced at a substantially constant rate of flow, mixing the gas and catalyst material with hydrocarbon fluid introduced at a substantially constant rate of flow and passing the resulting mixture through a conversion coil and controlling the rate of delivery of the catalyst material to the hydrocarbon fluid by utilizing the pressure drop across said agitating orifice and said conversion coil, separating the fouled catalyst particles from the products of reaction, passing the fouled catalyst particles to a container under substantially constant superatmospheric pressure, delivering the catalyst particles from said container through a second agitating orifice, mixing air at a substantially constant rate of flow with the catalyst particles and regenerating them in a regeneration zone, returning the regenerated catalyst particles to said first mentioned closed container and utilizing the pressure drop across said second agitating orifice and regeneration zone to control the rate of delivery of fouled catalyst particles being passed to said regeneration zone.

11. A method according to claim 10 within the pressure drop across said second agitating orifice and regeneration zone is regulated to control the rate of delivery of fouled catalyst particles being passed to said regeneration zone.

12. A method of controlling the rate of delivery from a container of fouled catalyst particles having carbonaceous deposits thereon, which comprises maintaining the catalyst particles under superatmospheric pressure in said container, delivering the catalyst particles from said container and then into a stream of regenerating fluid, passing the catalyst particles and regenerating fluid through a regeneration zone and regulating the pressure drop across said regeneration zone to control the rate of delivery of catalyst particles from said container.

13. A method of delivering controlled amounts of powdered material to a stream of gaseous fluid which comprises maintaining powdered material in a closed container under substantially constant superatmospheric pressure, delivering powdered material from said container through a fixed orifice and introducing it into a stream of fluid introduced at a substantially constant rate of flow and passing through a tubular treating apparatus associated with a second orifice and controlling the rate of delivery of the powdered material to the fluid stream by utilizing the pressure drop across said orifices.

14. In a method of catalytically cracking hydrocarbon oil wherein powdered catalyst is mixed with hydrocarbon oil and the mixture is passed through a conversion zone having an orifice associated therewith, the step of maintaining a substantially uniform delivery of catalyst to the hydrocarbon oil passing to said conversion zone which comprises maintaining a body of powdered catalyst under substantially uniform superatmospheric pressure in a confined space, delivering catalyst from said confined space through a second orifice and mixing the catalyst with oil vapors passing to said conversion zone at a substantially constant rate of flow, the pressure drop across said orifice being used to maintain the delivery of catalyst from said confined space substantially constant.

15. In a system for handling dry finely divided solid material, a reservoir for said material having an outlet, a conduit of restricted cross-sectional area communicating with said reservoir at the outlet, means for imposing substantially uniform superatmospheric fluid pressure on the reservoir, orifice means in said conduit, and means for regulating pressure drop across said orifice means, said orifice means including a non-compression screw associated with the bottom of said reservoir for agitating the finely divided solid material to be removed from said reservoir and passed to said conduit.

16. Apparatus for treating gaseous fluid materials in the presence of finely divided catalyst which includes a reactor having an inlet and an outlet, means for supplying a gaseous reactive fluid material at a substantially constant rate of flow to said reactor, a reservoir under substantially constant superatmospheric pressure and adapted to contain finely divided catalyst, an outlet associated with the bottom of said reservoir and provided with an agitating means for agitating the finely divided material leaving said reservoir through said outlet, said outlet communicating with said reactor for supplying catalyst thereto and means including said agitating means whereby the amount of catalyst supplied to said reactor is maintained substantially constant at the desired rate.

17. A method of delivering controlled amounts of powdered catalyst material to hydrocarbon fluids to be converted which comprises maintaining powdered catalyst material in a closed container under superatmospheric pressure, delivering powdered catalyst from said container through an agitating orifice and mixing it with a reactive gaseous stream introduced at a substantially constant rate of flow, passing the resulting mixture through a reaction zone and controlling the rate of delivery of the catalyst to the reactive gaseous fluid by controlling the superatmospheric pressure in said closed container.

EDWARD D. REEVES.